(12) United States Patent
Wang et al.

(10) Patent No.: US 8,826,785 B2
(45) Date of Patent: Sep. 9, 2014

(54) CUTTING MACHINE

(75) Inventors: Feizhou Wang, Osaka (JP); Hiroyoshi Kato, Osaka (JP)

(73) Assignee: Nakata Manufacturing Co., Ltd., Osaka-shi (JP)

( * ) Notice: Subject to any disclaimer, the term of this patent is extended or adjusted under 35 U.S.C. 154(b) by 298 days.

(21) Appl. No.: 13/218,986

(22) Filed: Aug. 26, 2011

(65) Prior Publication Data
US 2013/0047803 A1 Feb. 28, 2013

(51) Int. Cl.
B23B 5/14 (2006.01)

(52) U.S. Cl.
CPC .................................. *B23B 5/14* (2013.01)
USPC .............................. 82/70.2; 82/79

(58) Field of Classification Search
USPC ............... 82/59, 67, 70.2, 72, 75, 79, 86, 88; 83/54, 733
See application file for complete search history.

(56) References Cited

U.S. PATENT DOCUMENTS

| | | | | |
|---|---|---|---|---|
| 1,306,588 A | * | 6/1919 | France ............................... | 82/59 |
| 4,112,794 A | * | 9/1978 | Franks et al. ...................... | 82/64 |
| 4,802,278 A | * | 2/1989 | Vanderpol et al. ................ | 30/97 |
| 5,342,160 A | * | 8/1994 | Nakajima ..................... | 414/412 |
| 6,981,437 B2 | * | 1/2006 | Ogawa ............................ | 82/70.2 |
| 7,000,512 B2 | * | 2/2006 | Dunlap et al. .................... | 83/23 |

FOREIGN PATENT DOCUMENTS

| | | | |
|---|---|---|---|
| CH | 633742 A5 | * | 12/1982 |
| JP | 2011036986 A | * | 2/2011 |

OTHER PUBLICATIONS

Full English machine translation of JP 2011036986.*
English machine translation of JP 2011036986, published Feb. 28, 2013, accessed in 2014.*

* cited by examiner

*Primary Examiner* — Andrea Wellington
*Assistant Examiner* — Alan Snyder
(74) *Attorney, Agent, or Firm* — Oblon, Spivak, McClelland, Maier & Neustadt, L.L.P.

(57) ABSTRACT

A rotary face plate is simply configured by including only a machine mechanism for rotating it on its axis. In order to achieve the configuration, a swing arm for a rotary blade is mounted on one side of the rotary face plate whereas a driving motor and a swing motor for the rotary blade in each of the swing arms are independently mounted on each of the swing arms on the other side. One side has only a function of rotating and cutting on the boundary of the face plate, and therefore, cutting chips can be remarkably readily removed. Only a rotating motor for a drive source is mounted on the other side. As a consequence, a round tube or a square tube having a square cross section can be cut only by controlling the motor for rotating the rotary face plate at a required angle.

6 Claims, 6 Drawing Sheets

CUTTING MACHINE

BACKGROUND OF THE INVENTION (1) Field of the Invention

The present invention relates to an improvement in a cutting machine, in which two to four rotary blades are arranged around a cut material in a positionally variable manner, and further, the rotary blades are revolved along the outer periphery of the cut material at the same time and, more particularly, to a cutting machine, in which a square type tube having a square or rectangular cross section (hereinafter referred to as a square tube) in addition to a round type tube (hereinafter referred to as a round tube) can be cut within wide ranges of a size and a thickness at a high cutting speed or with a long lifetime of the rotary blade.

(2) Description of Related Art

A method for cutting a round tube or a square tube is exemplified by a method for moving a rotary blade or band saw having a large diameter in one diameter direction of a tube, and then, cutting the tube (hereinafter referred to as an R method). Alternatively, a method for cutting a round tube is exemplified by a method for revolving a rotating rotary blade on the tube, and then, cutting the tube. Specifically, there is a method for disposing one to three rotary blades in a doughnut-like face plate so as to rotate the face plate on the tube (hereinafter referred to as a θ method).

In the θ method, in which the face plate is rotated, a tube having a different diameter or a square tube cannot be cut. Therefore, a plurality of swing cutters, each including a swing arm having the rotary blade attached to the tip thereof and pivotally disposed in the face plate at the base end thereof, are disposed in the face plate, and then, the rotary blade is positionally controlled at a swing angle of each of the arms and a revolutionary angle of the face plate, so as to cut the tube (hereinafter referred to as a θ-θ method). (Japanese Patent No. 2939409 and Japanese Patent Application Publication No. Sho 62-27926)

In the same manner, another method for cutting a tube having a different diameter or a square tube is exemplified by a method for disposing, in a doughnut-like face plate, rotary blades disposed opposite to each other in a tube diameter direction in a positionally adjustable manner in a diameter direction, and then, rotating the face plate on the tube (hereinafter referred to as an R-θ method).
(Japanese Patent Application Laid-open No. Hei 09-47914)

A machine adopting the above-described θ-θ method requires a complicated machine mechanism for rotating rotary rings for inner circumferential teeth and outer peripheral teeth and numerous gears in a coaxially overlapping manner in order to rotate a saw blade; and a machine mechanism adapted to rotate the face plate for pivotally supporting a cutter head in order to adjust the swing of the cutter head or the position of a cut material in an outer peripheral direction. As the machine becomes larger in size, it is necessary to rotate a considerably heavy article and mechanically control its position. As a consequence, there rise the problems that the machine mechanism is complicated in the machine, mechanical processing for a large-diameter gear having a complicated curve or the like is cumbersome in fabricating, and further, maintenance during operation is not easy.

On the other hand, the R-θ method has experienced the following problems. Specifically, it is necessary to provide a rotary blade unit including a drive motor, a gear box, and a rotary blade in a movable manner in a radial direction of the face plate together with its drive source and a machine mechanism for rotating the face plate per se having the rotary blade unit provided therein. As the machine becomes larger in size, it is necessary to rotate a considerably heavy article and control it. Moreover, a traveling cutter need be constituted so as to move the above-described cutting machine at the same speed as that of the cut material, and further, much power is required for rotating the face plate having the heavy article and driving a traveling vehicle mounting them thereon.

SUMMARY OF THE INVENTION

Like the conventional θ-θ method, an object of the present invention is to provide a cutting machine capable of cutting a square tube having a square or rectangular cross section in addition of a round tube within wide ranges of a size and a thickness, in which the cutting machine is simply constituted by a rotary face plate per se including only a machine mechanism for rotating it on its axis and another machine mechanism simply configured to swing a rotary blade, so as to simplify the machine and facilitate maintenance.

The present inventors variously studied and directed to a configuration which has the same function as that of the cutting machine in the conventional θ-θ method and adopts a simple machine mechanism. As a result, two to four swing arms for rotary blades swingably and drivably held via a pivot to a face plate are arranged at equal intervals on one side of the rotatably held rotary face plate, whereas a rotating and driving motor for transmitting drive force and a swing motor for transmitting swing force are mounted via the pivot of each of the swing arms on the other side of the rotary face plate. In other words, the swing arm for the rotary blade is mounted on one side of the rotary face plate whereas the rotating and driving motor and the swing motor for the rotary blade of each of the swing arms are independently mounted in each of the swing arms on the other side. With the above-described configuration, not only the object can be achieved but also one side has only the function of rotating and cutting on the boundary of the face plate whereas the other side mounts thereon only the rotating motor for the drive source. Therefore, cutting chips can be remarkably readily removed only on one side of the rotary face plate. A round tube or a square tube having a square cross section can be cut by controlling only a motor for rotating the rotary face plate per se at a required angle. The present inventors found the above-described advantages, and then, completed the present invention.

Specifically, the present invention relates to a cutting machine including:

a rotary face plate which has a cut material passing hole at its center and is rotatably held on the center of the passing hole, and further, is provided with a rotating and driving motor for achieving rotation at a required angle;

a swing arm which is pivotally supported at one end thereof on one side of the rotary face plate whereas, at the other end thereof, is swingably held between the outer peripheral side of the face plate and the inner circumferential side of the passing hole via the pivot;

a rotating driving motor which is placed on the other side of the rotary face plate and transmits drive force via the pivot of the swing arm; and a swing motor which is placed on the other side of the rotary face plate and transmits swing force via the pivot of the swing arm, the swing arm, which pivotally supports the cutting rotary blade at the other end thereof and incorporates therein a mechanism for transmitting drive force from the rotating and driving motor, including:

swing angle control means for varying the swing angle of the swing arm according to the dimensional shape of the cut material so as to bring the rotary blade into contact with the cut material when the cut material is cut; and rotational angle control means for rotating, at a required angle on its axis, the rotary face plate mounting thereon the swing arm for pressing the rotary blade against the cut material.

Moreover, the present invention proposes in the above-described cutting machine that two, three, or four swing arms should be mounted on the rotary face plate; and the swing arm should be swingably supported at one or more portions other than the pivot on the rotary face plate, and thus, the swing arm is swung at the other end thereof between the outer peripheral side of the rotary face plate and the inner circumferential side of the passing hole.

In the cutting machine according to the present invention, the round tube or the square tube and a rod material having various cross sections can be cut in a configuration in which one swing arm is mounted on the rotary face plate. Moreover, the round tube can be cut within wide ranges of a size and a thickness in a configuration in which three swing arms are mounted. In addition, the round tube or the square tube having a square or rectangular cross section can be cut within wide ranges of a size and a thickness in a configuration in which two or four swing arms are mounted. In any of the configurations, the rotary face plate per se is simply configured by including only the machine mechanism for rotating it on its axis. The machine can be simplified and miniaturized and maintenance can be facilitated by adopting a simple configuration of another machine mechanism for swing the rotary blade.

In the cutting machine according to the present invention, the swing arm for the rotary blade is mounted on one side of the rotary face plate whereas the driving motor and swing motor for the rotary blade for each of the swing arms are independently mounted on each of the swing arms on the other side. With the above-described configuration, not only the machine can be simplified and miniaturized, but also one side has only the rotating and cutting functions on the boundary of the face plate whereas the other side has the motor for the drive source thereon. Consequently, these heavy articles can be collected within a required radius at a position of the rotary face plate so as to appropriately distribute the weight of the rotary face plate to be rotated on its axis. In addition, the cutting chips produced during the cutting operation can be readily removed only on one side. Additionally, the motor for rotating the rotary face plate per se at the required angle and/or the swing motor for the swing arm is just controlled during the cutting operation, with the attendant advantage of operability.

In the cutting machine according to the present invention, a support guide is disposed at the tip at which the swing arms each have the rotary blade and swing, as illustrated in Examples. Consequently, the swing angle can be held with high accuracy, an excellent cutting quality can be achieved without exerting vibration or swing of the rotary blade per se rotating at a high speed on the cut material, and further, the lifetime of the rotary blade can be prolonged.

DETAILED DESCRIPTION OF PREFERRED EMBODIMENTS

According to the present invention, a rotary face plate may be constituted of mainly a disk plate member. As illustrated in an embodiment, a cylindrical cover member may be disposed, as required, and it may be appropriately not only self-held by a support roller or the like but also pivotally supported. The rotary face plate may be driven to be rotated on its axis by a roller, a gear, or a belt.

A swing arm disposed in the rotary face plate may be appropriately formed in a box or frame structure. In addition, a mechanism for transmitting the drive force of a rotary blade may be appropriately selected from a gear, a belt, a chain, a shaft, and the like. The swing arm is configured to be swingably supported on the rotary face plate at one or more points other than the pivot by adopting any of known sliding mechanisms. For example, like in the embodiment, a known linear guide which is hardly affected by cutting chips during a cutting operation may be applied to an arcuate guide at a swing tip of the swing arm, or a mechanism for slidably moving the arm in an arcuate manner in combination of the linear guide is disposed at the center of the arm.

As illustrated in the embodiment, as a swing mechanism for the swing arm may be appropriately adopted a constitution in which the rotational force of a motor is utilized by disposing an arcuate gear in a collar of an arm pivot, and a constitution utilizing machine mechanisms such as a cam and a lever.

As motors for rotating the rotary face plate on its axis and driving and swing the rotary blade may be appropriately adopted hydraulic, hydrostatic, and pneumatic motors according to functions in addition to a normal electric motor as long as rotation can be controlled by controlling or suppressing a rotational speed.

Embodiment

Figure 1:
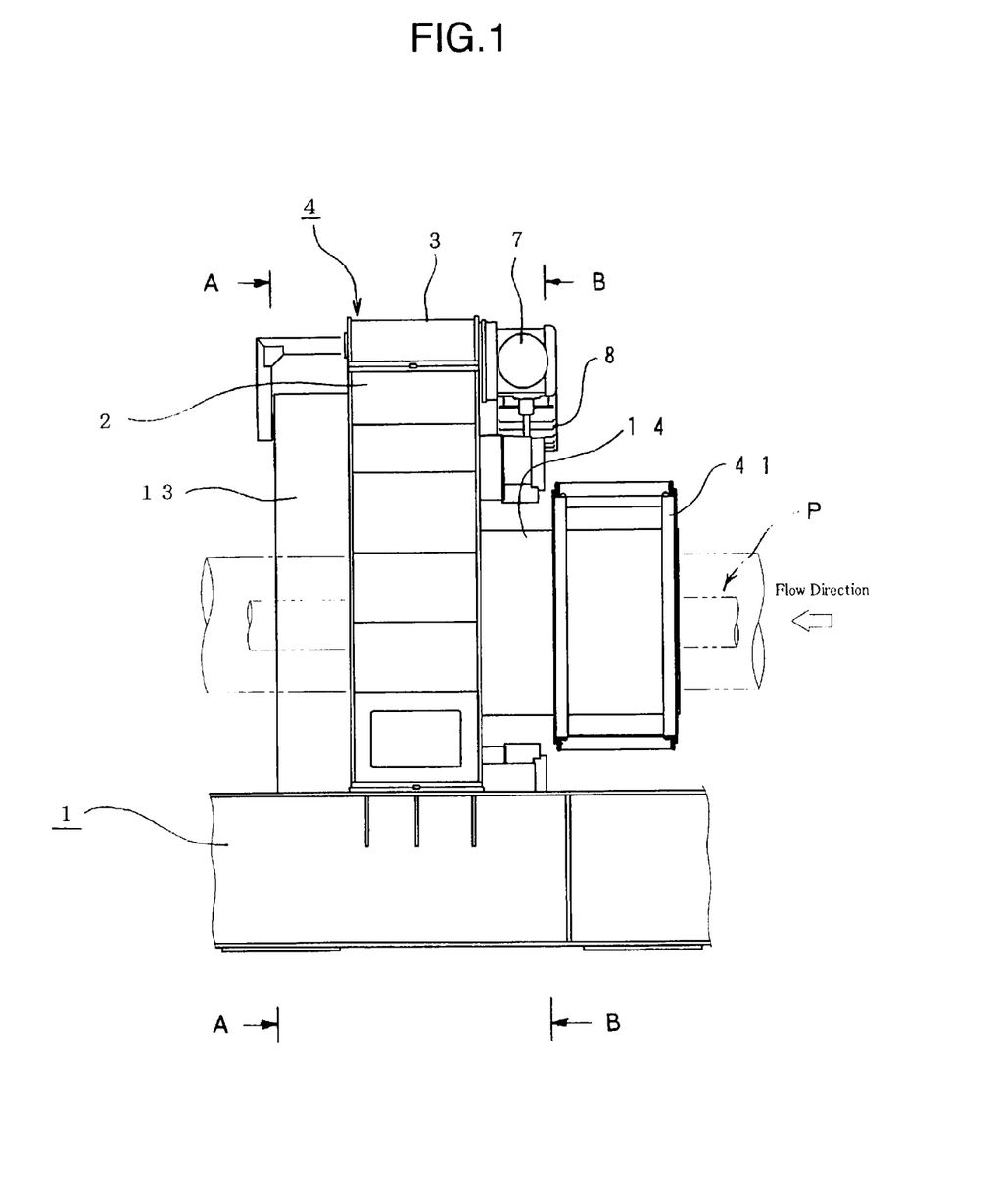
FIG. 1 is a front explanatory view of a cutting machine in one embodiment according to the present invention.
Figure 2:
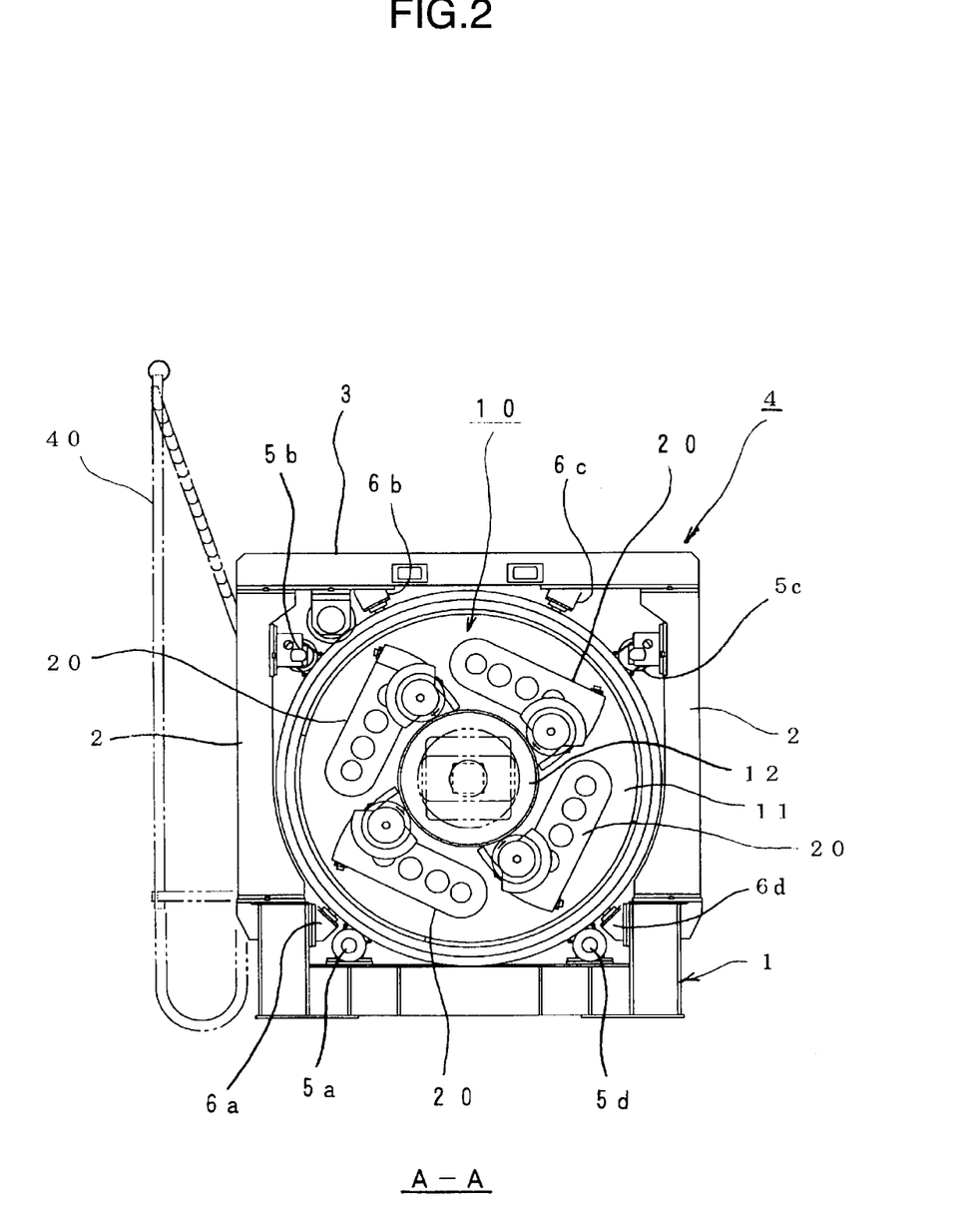
FIG. 2 is an explanatory view taken along line A-A of FIG. 1, as viewed on an output side of a cut material and a side on which a rotary blade of a rotary face plate is disposed.
Figure 3:
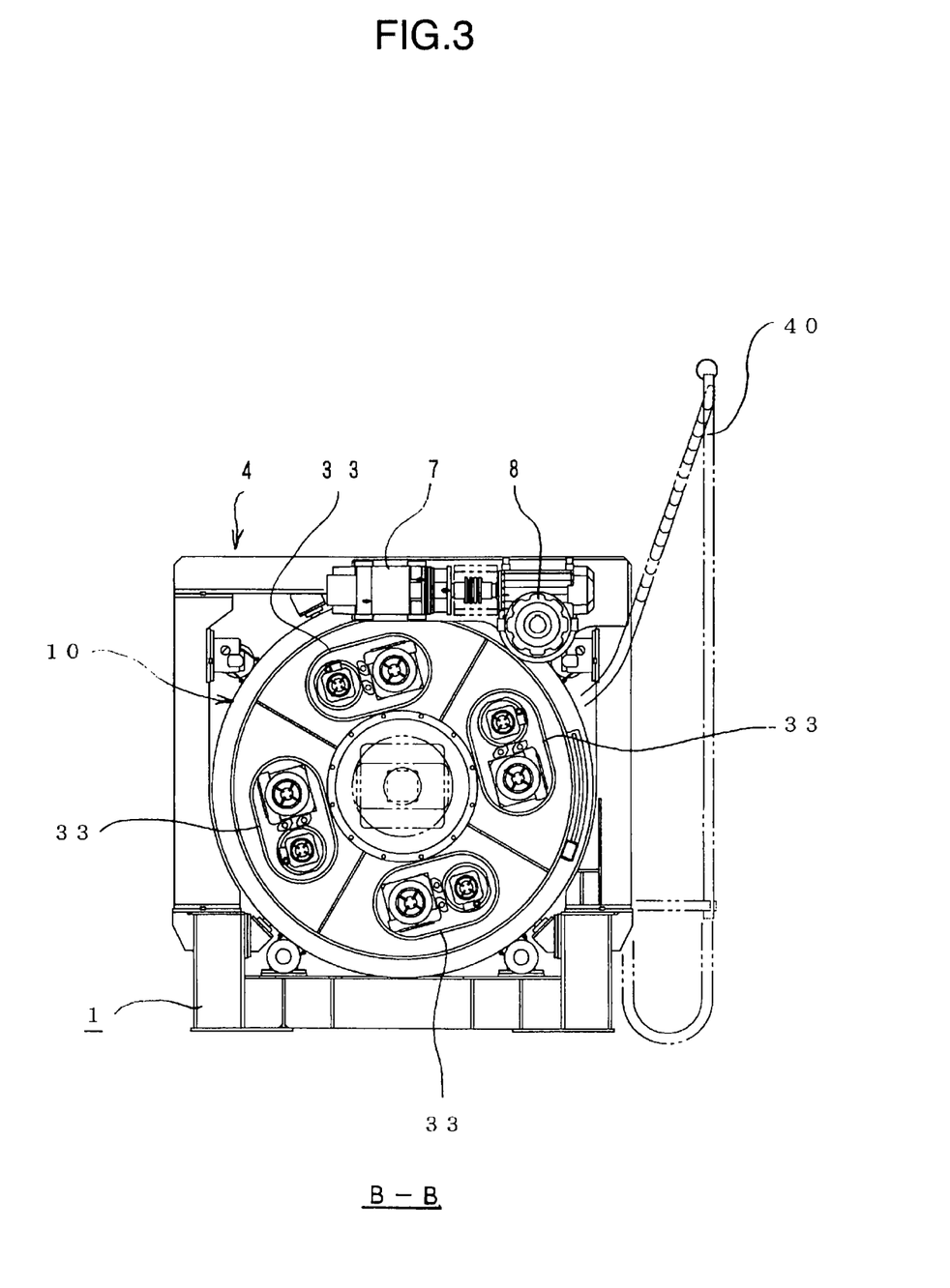
FIG. 3 is an explanatory view taken along line B-B of FIG. 1, as viewed on an input side of a cut material and a side on which a drive motor for the rotary blade of the rotary face plate is mounted.

A cutting machine shown in FIGS. 1 to 3 is constituted of four pieces of blades capable of cutting a cut material P which is a square tube Ps having a square cross section and a square tube Pr having a rectangular cross section in addition to a normal round tube Pp. The basic structure of a cutter is configured by rotatably housing a rotary face plate 10 inside of a frame 4 formed by connecting a pair of columns 2 and 2 erected on a base table 1 via a horizontal beam 3. As shown in FIG. 1, the cut material P is moved from right to left in the drawing.

The rotary face plate 10 is formed into a short cylinder including cylindrical frames 13 disposed on both sides of a disk 11 having a required thickness. A passing hole 12 for allowing the cut material P to pass therethrough is formed at the center of the disk. The rotary face plate 10 is rotatably supported at the center and outer peripheral surface thereof by rotation supporting rollers 5a to 5d in four outer peripheral directions inside of the frame 4. Moreover, drop preventing rollers 6a to 6d extending in the four outer peripheral directions are brought into contact with the respective bottoms of grooves formed at the center and outer peripheral surface thereof, not shown. Furthermore, gears are provided at the center and outer peripheral surface of the rotary face plate 10. Driving gears meshing with the above-described gears are driven, via a decelerator 8, by a rotating motor 7 mounted on the beam 3 of the frame 4, so that the rotary face plate 10 is rotated on its axis.

Figure 5:
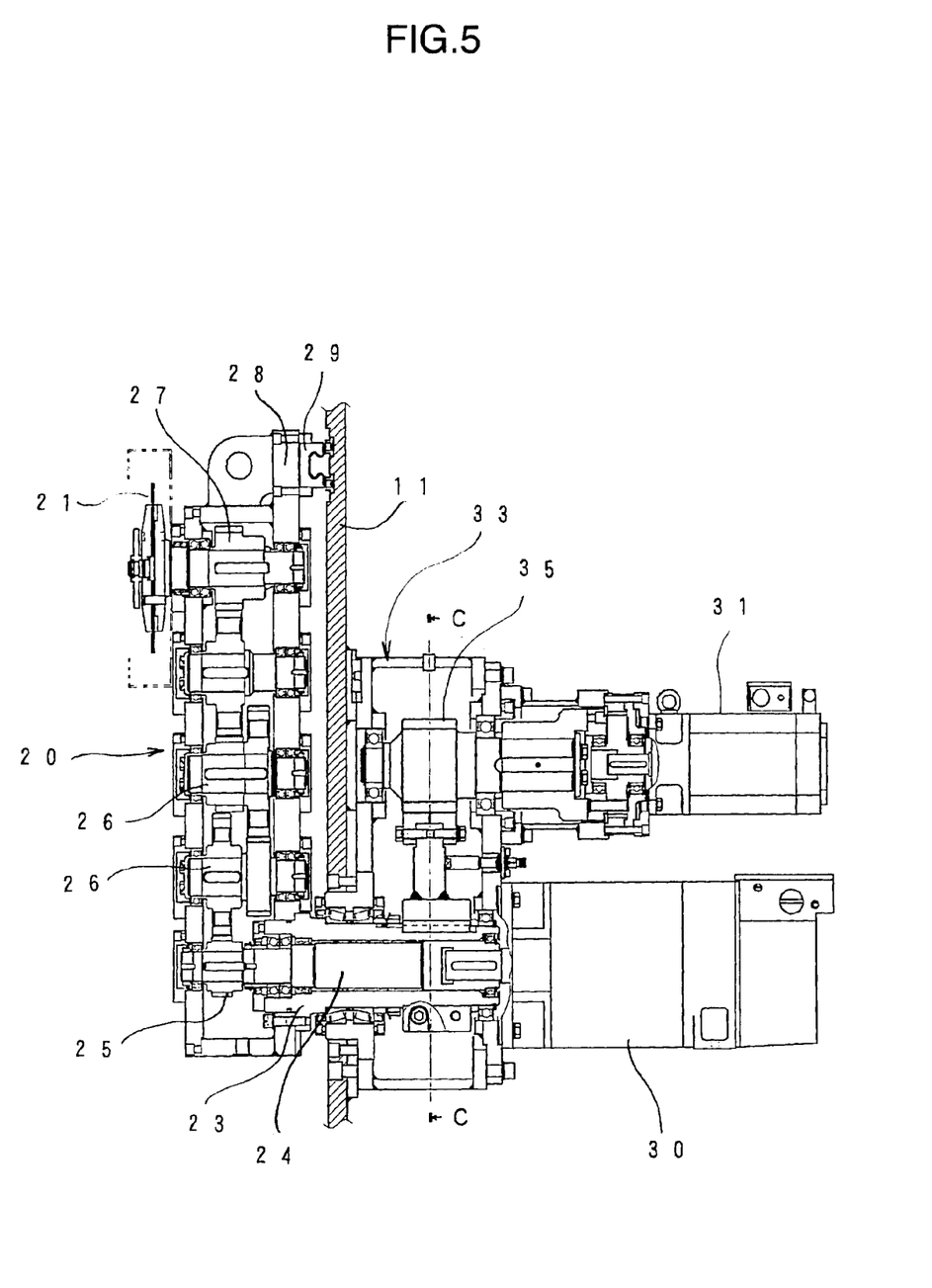
FIG. 5 is a sectional explanatory view of the swing arm provided with the rotary blade, a driving machine mechanism for the swing arm, and a swing machine mechanism for the arm, taken in the plate thickness direction of the rotary face plate.

As shown in FIG. 2, four swing arms 20, each having a cutting rotary blade 21, are arranged at equal intervals on the disk 11 of the rotary face plate 10, as viewed on the output side of the cut material P. The swing arm 20 is formed into a box having a required length. As shown in FIG. 5, a pivot 22 for swingably supporting the base end penetrates through the disk 11. A driving shaft 24 is pivoted inside of a collar 23 to be secured to the swing arm 20 in the pivot 22. A gear 25 disposed at the tip of the shaft 24 meshes with a gear train 26 arranged inside of the swing arm 20. In this manner, drive force is transmitted to a gear 27 of the rotary blade 21 pivoted at the tip of the swing arm 20.

Figure 4:
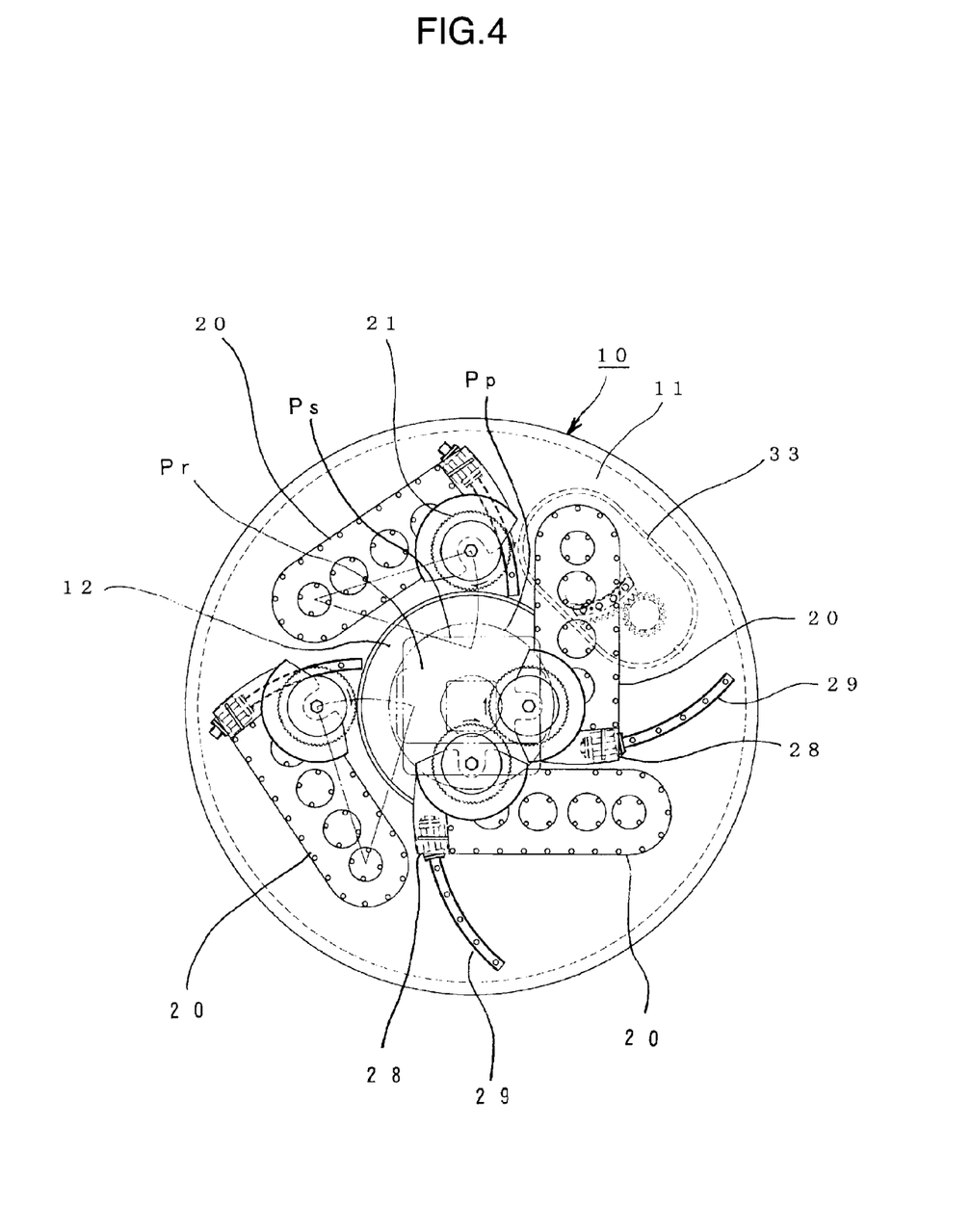
FIG. 4 is an explanatory view of the relationship between a swing arm provided with the rotary blade and the cut material, as viewed on a side on which the rotary blade of the rotary face plate is disposed.

As shown in FIGS. 4 and 5, a guide bearing 28 is disposed at the swing tip of the swing arm 20. The guide bearing 28, which slidably moves astride an arcuate guide rail 29 extending from the outer periphery on the disk 11 side toward the passing hole 12, and the pivot 22 support the swing arm 20 at both ends thereof during swing.

As shown in FIG. 3, a motor unit 33 constituted by pairing a rotation driving motor 30 for the cutting rotary blade 21 and a swing motor 31 for the swing arm 20 on the same support frame 32 is securely located at the pivot 22 of each of the swing arms 20 on the disk 11, as viewed on the input side of the cut material P of the rotary face plate 10. Moreover, as shown in FIGS. 1 and 3, a cylindrical frame 14 is disposed at the passing hole 12 formed in the disk 11 in such a manner as to cover the cut material P.

As shown in FIG. 5, the driving shaft 24 incorporated in the pivot 22 of the swing arm 20 penetrating the disk 11 is connected to a spindle of the rotation driving motor 30 in the motor unit 33. In addition, the collar 23 in the pivot 22 of the swing arm 20 extends inside of the support frame 32 in the motor unit 33 secured to the disk 11. An arcuate gear 34 is disposed on the outer periphery of the extension, to thus mesh with a spindle gear 35 for the swing motor 31.

Figure 6:
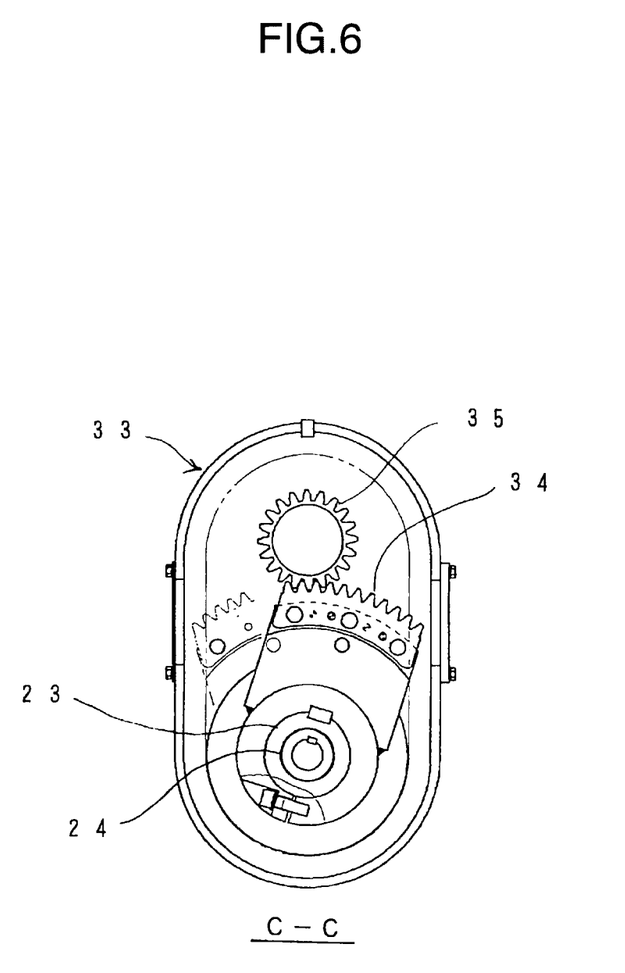
FIG. 6 is an explanatory view of the machine mechanism for swing the swing arm provided with the rotary blade, taken along line C-C of FIG. 5.

On the other hand, as shown in FIG. 6, the rotation of the spindle gear 35 for the swing motor 31 can swing the swing arm 20 having the collar 23 fixed thereto via the collar 23 in the pivot 22. As a consequence, the rotational control by the rotation driving motor 30 can adjust the cutting force of the rotary blade 21, and further, the rotational control by the swing motor 31 can swing the swing arm 20 so as to control the position of the rotary blade 21.

A guide stand 40 shown in FIG. 3 is adapted to support a cable, not shown, for driving and controlling each motor in the motor unit 33 disposed on the disk 11 side, which is visible on the input side of the cut material P. First, the cables from the motors in the motor unit 33 are appropriately routed on the disk 11 side, and further, are bundled from one portion on the disk 11 side in parallel to the cylindrical frame 14 disposed on the disk 11 side. Moreover, the cables are wound by a required length around a cable winding drum 41 disposed at the tip of the cylindrical frame 14, and then, are borne on the guide stand 40. Consequently, these cables are configured in such a manner as not to prevent the rotational operation even if the rotary face plate 10 is controlled to be rotated on its axis at a required rotational angle.

Description will be made below on the cutting method for the cut material P with reference to FIG. 4. In the case of cutting the round tube Pp or the square tube Ps having a square cross section, the four rotary blades 21 approach the round tube Pp or the square tube Ps at the same time. The swing arms 20 are controlled by the swing motors 31, respectively, in such a manner as to press the tube after the abutment. At the same time, the rotary face plate 10 is controlled to be rotated at about 90° with respect to the round tube Pp or the square tube Ps by the rotating motor 7, thereby completing the cutting operation. In this case, the swing angle of each of the swing arms 20 is controlled such that each of the rotary blades 21 conforms with the outer shape of the round tube Pp or the square tube Ps. In addition, when the diameter of the round tube Pp or the square tube Ps is changed from a large diameter to a small diameter, the swing angle of each of the swing arms 20 is controlled in advance such that the rotary blades 21 approach the cut material P.

On the other hand, in the case of cutting the square tube Pr having a rectangular cross section, since the short side and the long side on the outer periphery are different in length, it is natural that each of the swing arms 20 should be controlled at its swing angle such that each of the rotary blades 21 conforms with the outer shape of the square tube Pr. Additionally, a control program can be created such that the four rotary blades 21 complete the cutting operation at the same time by changing a timing of approach or separation of the rotary blades 21 on the short side and long side to or from the square tube Pr or changing the rotational speed of the rotary face plate 10.

In the above-described configuration of the cutting machine shown in FIGS. 1 to 3, the cutting machine is modified to achieve a stationary type in which cut materials P are sequentially fed into the machine. Alternatively, a traveling vehicle which can travel at the same speed as that of a cut material P in a movement direction of the cut material P and return to a starting point during a reciprocating motion is prepared, and then, the base table 1 is mounted on the traveling vehicle or the base table 1 per se can travel by itself, thus achieving a traveling cutter.

EXAMPLE 1

With above-described configuration of the cutting machine provided with the four swing arms shown in FIGS. 1 to 3, the diameter of the round tube was set in such a manner that the round tube having a maximum outer diameter of 660 mm could be cut. A minimum outer diameter of 200 mm was achieved, and a thickness of 4 mm to 25.4 mm was achieved. As for the square tube having a square cross section, the outer dimension ranged from 550 mm to 200 mm, and the thickness ranged from 4 mm to 25.4 mm. Moreover, as for the square tube having a rectangular cross section, the outer dimension ranged from 600×400 mm to 400×200 mm, and the thickness ranged from 4 mm to 25.4 mm.

With the above-described configuration, the rotary face plate was rotated at about 95° in one cutting operation, and further, at about 400° in four cutting operations, and thereafter, the rotary face plate was reversely rotated in the same direction in four cutting operations. These operations were repeated. Consequently, the cutting amount per unit time could be increased.

EXAMPLE 2

In the cutting machine having the above-described basic configuration shown in FIGS. 1 to 3, a configuration in which two rotary blades were arranged at positions opposite to each other in a diameter direction of a cut material and a configuration in which three rotary blades were arranged at equal intervals were fabricated, and then, the lifetime of each of the rotary blades in the case where the number of rotary blades was two, three, or four was measured. As a result, the cutting machine having the three blades had a lifetime 1.5 to 2 times that of the cutting machine having the two blades, and further, the cutting machine having the four blades had a lifetime 2 to 3 times.

EXAMPLE 3

In Example 2, no support mechanism was disposed at the tip of the swing arm in any case where the number of rotary blades was two, three, or four. However, a machine was configured such that a guide bearing bore the rotary blade by slidably moving the rotary blade during the swing. In this machine, the lifetime of the rotary blade was measured in the same manner. Since the swing of the swing arm was remarkably reduced, the quality of the cut face could be improved. In addition, the lifetime was prolonged by 10% to 30% in comparison with that in Example 2.

As is obvious from Examples, the present invention can provide the cutting machine, in which the square tube having the square or rectangular cross section in addition to the round tube can be cut at the high cutting speed within the wide ranges of a size and a thickness, the quality of the cut surface can be improved, or the lifetime of the rotary blade can be prolonged.

What is claimed is:

1. A cutting machine comprising:
   a rotary face plate which has a cut material passing hole at its center and is held by a frame rotatably about the passing hole, the rotary face plate being rotated at a required angle by a rotating motor provided for the frame;
   a swing arm which is pivotally supported at one end thereof on a first side of the rotary face plate and, at the other end thereof, is swingably held between an outer peripheral side of the face plate and an inner circumferential side of the passing hole via a pivot;
   a rotation driving motor which is placed on a second side of the rotary face plate, the second side of the rotary face plate being opposite to the first side of the rotary face plate, and the rotation driving motor transmits rotational drive force to the swing arm via a driving shaft in the pivot of the swing arm, the driving shaft extending through the rotary face plate from the second side to the first side;
   a swing motor which is placed on the second side of the rotary face plate and transmits swing force to the swing arm via a collar in the pivot of the swing arm, the collar extending through the rotary face plate from the second side to the first side, and the driving shaft being pivoted inside of the collar;
   a cutting rotary blade pivotally supported at the other end of the swing arm;
   a mechanism for transmitting the rotational drive force from the rotation driving motor to the cutting rotary blade, the mechanism being provided within the swing arm;
   swing angle control means for varying the swing angle of the swing arm according to the dimensional shape of the cut material so as to bring the cutting rotary blade into contact with the cut material when the cut material is cut; and
   rotational angle control means for rotating, at a required angle on its axis, the rotary face plate including the swing arm mounted thereon for pressing the cutting rotary blade against the cut material.

2. The cutting machine according to claim 1, wherein two, three, or four swing arms are mounted on the rotary face plate.

3. The cutting machine according to claim 1, wherein the swing arm is swingably supported at one or more portions other than the pivot on the rotary face plate, and thus, the swing arm is swung at the other end thereof between the outer peripheral side of the rotary face plate and the inner circumferential side of the passing hole.

4. The cutting machine according to claim 1, wherein the mechanism for transmitting the rotational drive force from the rotation driving motor to the cutting rotary blade includes the driving shaft of the rotation driving motor and a plurality of gears that are driven by the driving shaft to transmit the rotational drive force from the rotation driving motor to the cutting rotary blade.

5. The cutting machine according to claim 1, wherein the swing angle control means include a spindle gear rotated by the swing motor, an arcuate gear in mesh with the spindle gear and driven by the spindle gear, and the collar attached to the swing arm that is driven by the arcuate gear to vary the swing angle of the swing arm.

6. The cutting machine according to claim 1, wherein the rotational angle control means include the rotating motor provided for the frame and gears driven by the rotating motor to rotate the rotary face plate.

* * * * *